United States Patent
Chen et al.

(10) Patent No.: US 11,595,948 B2
(45) Date of Patent: Feb. 28, 2023

(54) RESOURCE ALLOCATION PATTERNS FOR SCHEDULING SERVICES IN A WIRELESS NETWORK

(71) Applicant: QUALCOMM Incorporated, San Diego, CA (US)

(72) Inventors: Wanshi Chen, San Diego, CA (US); Jing Jiang, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/617,507

(22) Filed: Jun. 8, 2017

(65) Prior Publication Data

US 2018/0092081 A1 Mar. 29, 2018

Related U.S. Application Data

(60) Provisional application No. 62/399,049, filed on Sep. 23, 2016.

(51) Int. Cl.
*H04W 72/04* (2009.01)
*H04W 72/12* (2023.01)
(Continued)

(52) U.S. Cl.
CPC ....... *H04W 72/0406* (2013.01); *H04W 16/14* (2013.01); *H04W 72/1242* (2013.01);
(Continued)

(58) Field of Classification Search
CPC ............... H04W 72/042; H04W 72/04; H04W 72/0446; H04W 72/0406; H04W 72/0453;
(Continued)

(56) References Cited

U.S. PATENT DOCUMENTS 9,516,636 B2 * 12/2016 Park ................... H04W 72/0446
10,749,644 B2 * 8/2020 Islam ...................... H04L 5/001
(Continued)

FOREIGN PATENT DOCUMENTS

CN 103370976 A 10/2013
CN 105474668 A 4/2016
(Continued)

OTHER PUBLICATIONS

Intel Corporation: "Frame Structure Considerations for URLLC", 3GPP Draft; R1-167127, Intel URLLC Frame Structure V2, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 21, 2016, XP051125728, Retrieved from the Internet: URL:http://www.3gpp.org/ftp/Meetings_3GPP_SYNC/RAN1/Docs/ [retrieved on Aug. 21, 2016], 10 pages.
(Continued)

*Primary Examiner* — Allahyar Kasraian
(74) *Attorney, Agent, or Firm* — Patterson+ Sheridan, L.L.P.

(57) ABSTRACT

Certain aspects of the present disclosure provide techniques for determination, selection, configuration, and/or indication of resource allocation patterns for scheduling services, such as reliable low-latency services (e.g., ultra-reliable low latency communications (URLLC)) and other services in a wireless network, such as new radio (NR) (e.g., a 5G network). A method of wireless communication by a user equipment (UE) is provided. The method generally includes determining a resource allocation pattern that defines resources, from a plurality of configured resource allocation patterns, wherein at least one of the plurality of configured resource allocation patterns comprises a plurality of resource elements with at least a first resource element associated
(Continued)

with a first resource allocation restriction and at least a second resource element associated with a second resource allocation restriction and communicating based on the determined resource allocation pattern.

30 Claims, 10 Drawing Sheets

(51) Int. Cl.
  *H04W 16/14* (2009.01)
  *H04W 16/32* (2009.01)
  *H04W 72/0446* (2023.01)
  *H04W 72/0453* (2023.01)
  *H04W 72/044* (2023.01)

(52) U.S. Cl.
  CPC ........ *H04W 16/32* (2013.01); *H04W 72/0446* (2013.01); *H04W 72/0453* (2013.01); *H04W 72/0473* (2013.01)

(58) Field of Classification Search
  CPC ... H04W 72/0413; H04W 4/70; H04W 72/02; H04W 72/082; H04W 72/1289; H04W 72/044; H04W 72/121; H04W 16/02; H04W 16/10; H04W 16/32; H04W 72/00; H04W 72/1226; H04W 72/1242; H04W 72/1273; H04W 74/004; H04W 72/0473; H04W 72/1257; H04W 72/1263; H04W 72/1268; H04W 72/1294; H04W 74/006; H04W 74/0866; H04L 5/0007; H04L 5/0094; H04L 5/00; H04L 5/0073; H04L 5/0023; H04L 5/0055; H04L 5/0092; H04L 5/001; H04L 5/0035; H04L 5/0032; H04L 5/1469

See application file for complete search history.

(56) References Cited

U.S. PATENT DOCUMENTS

| | | | |
|---|---|---|---|
| 2008/0123593 | A1 | 5/2008 | Fujita et al. |
| 2012/0058791 | A1 | 3/2012 | Bhattad et al. |
| 2012/0113917 | A1* | 5/2012 | Gaal ............ H04L 5/1438 370/329 |
| 2012/0208547 | A1* | 8/2012 | Geirhofer ............ H04B 7/0626 455/452.2 |
| 2013/0083719 | A1* | 4/2013 | Seo ............ H04W 72/042 370/312 |
| 2013/0163532 | A1 | 6/2013 | Anderson et al. |
| 2015/0110010 | A1 | 4/2015 | Wei et al. |
| 2015/0208387 | A1* | 7/2015 | Awad ............ H04W 72/042 370/329 |
| 2015/0327315 | A1 | 11/2015 | Xue et al. |
| 2016/0142976 | A1 | 5/2016 | Li et al. |
| 2016/0242229 | A1 | 8/2016 | Balachandran et al. |
| 2016/0270059 | A1 | 9/2016 | Chen et al. |
| 2017/0196014 | A1* | 7/2017 | Qin ............ H04W 72/082 |
| 2018/0035459 | A1* | 2/2018 | Islam ............ H04L 1/16 |
| 2018/0063858 | A1* | 3/2018 | Au ............ H04W 16/14 |
| 2018/0077603 | A1* | 3/2018 | John Wilson ..... H04W 72/0406 |
| 2018/0295608 | A1* | 10/2018 | Nguyen ............ H04L 5/0053 |
| 2018/0338319 | A1* | 11/2018 | Kim ............ H04W 76/14 |
| 2020/0037278 | A1* | 1/2020 | Han ............ H04W 56/0045 |
| 2020/0245300 | A1* | 7/2020 | Kim ............ H04B 7/063 |

FOREIGN PATENT DOCUMENTS

| | | |
|---|---|---|
| CN | 105979597 A | 9/2016 |
| EP | 2861010 A1 | 4/2015 |
| WO | 2015180065 A1 | 12/2015 |
| WO | WO-2016139555 A1 | 9/2016 |
| WO | WO-2016144574 A1 | 9/2016 |

OTHER PUBLICATIONS

International Search Report and Written Opinion—PCT/US2017/052380—ISA/EPO—dated Nov. 29, 2017.
LG Electronics: "Handling URLLC in New RAT," 3GPP Draft; R1-166886; 3rd Generation Partnership Project (3GPP), Mobile Competence Centre; 650, route des Lucioles; F-06921 Sophia-Antipolis Cedex; France; vol. RAN WG1, No. Gothenburg, Sweden; Aug. 22, 2016-Aug. 26, 2016; Aug. 21, 2016 (Aug. 21, 2016), 5 pages, XP051125623,Retrieved from the Internet:URL:http://www.3gpp.org/ftp/Meetings_3GPP_SYNC/RAN1/Docs/ [retrieved on Aug. 21, 2016].
LG Electronics: "Overall Discussion on URLLC", 3GPP Draft; R1-166882, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 21, 2016, XP051125619, Retrieved from the Internet: URL:http://www.3gpp.org/ftp/Meetings_3GPP_SYNC/RAN1/Docs/ [retrieved on Aug. 21, 2016], 5 pages.
NTT Docomo et al., "On Co-Existence of eMBB and URLLC", 3GPP Draft; R1-167391, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 21, 2016, XP051125879, Retrieved from the Internet: URL:http://www.3gpp.org/ftp/Meetings_3GPP_SYNC/RAN1/Docs/ [retrieved on Aug. 21, 2016], 5 pages.
Qualcomm Incorporated: "An Interleaved RE Mapping for Downlink LTE Overlaid by Intra-Cell Low Latency Operation", 3GPP Draft, 3GPP TSG RAN WG1 #86, R1-166314, 3rd Generation Partnership Project (3GPP), Mobile Competence Centre, 650, Route Des Lucioles, F-06921 Sophia-Antipolis Cedex, France vol. RAN WG1, No. Gothenburg, Sweden, Aug. 22, 2016-Aug. 26, 2016 Aug. 21, 2016 (Aug. 21, 2016), XP051140162, 13 Pages, Retrieved from the Internet: URL:http://www.3gpp.org/ftp/Meetings_3GPP_SYNC/RAN1/Docs/ [retrieved on Aug. 21, 2016].
Samsung: "PUSCH Scheduling and Resource Allocation", 3GPP Draft, 3GPP TSG RAN WG1 #86, R1-166686 LAA PUSCH, 3rd Generation Partnership Project (3GPP), Mobile Competence Centre, 650, Route Des Lucioles, F-06921 Sophia-Antipolis Cedex, France vol. RAN WG1, No. Gothenburg, Sweden, Aug. 22, 2016-Aug. 26, 2016 Aug. 21, 2016 (Aug. 21, 2016), XP051125509, pp. 1-2, Retrieved from the Internet: URL:http://www.3gpp.org/ftp/Meetings_3GPP_SYNC/RAN1/Docs/ [retrieved on Aug. 21, 2016].
Huawei, et al., "Discussion on Frame Structure for NR", 3GPP TSG RAN WG1 Meeting #85, R1-164032, 3rd Generation Partnership Project (3GPP), Mobile Competence Centre, 650, Route Des Lucioles, F-06921, Sophia-Antipolis Cedex, France, vol. RAN WG1, No. Nanjing , P.R. China, May 23, 2016-May 27, 2016, May 15, 2016 (May 15, 2016), XP051089779, Retrieved from the Internet: URL: http://www.3gpp.org/ftp/tsg_ran/WG1_RL1/TSGR1_85/Docs/ , [ retrieved on May 15, 2016] , Chapters 1, 2.1, 2.2 and 2.4, 8 pages.
Taiwan Search Report—TW106132187—TIPO—dated Jun. 9, 2021.
European Search Report—EP22163222—Search Authority—The Hague—dated May 10, 2022.

* cited by examiner

RESOURCE ALLOCATION PATTERNS FOR SCHEDULING SERVICES IN A WIRELESS NETWORK

CROSS-REFERENCE TO RELATED APPLICATION & PRIORITY CLAIM

This application claims benefit of and priority to U.S. Provisional Patent Application Ser. No. 62/399,049, filed Sep. 23, 2016, which is herein incorporated by reference in its entirety for all applicable purposes.

BACKGROUND

Field of the Disclosure

Aspects of the present disclosure relate generally to wireless communications systems, and more particularly, to resource allocation patterns for scheduling services, such as reliable low-latency services (e.g., ultra-reliable low-latency communications (URLLC)) and other services, in a wireless network, such as new radio (NR) (e.g., a 5G network).

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include 3rd Generation Partnership Project (3GPP) Long Term Evolution (LTE) systems, LTE-Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of BSs that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

In an NR or 5G networks, the wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., CU, central nodes (CNs), access node controllers (ANCs), etc.), where a set of one or more distributed units (DUs), in communication with a CU, may define an access node (e.g., AN, NR BS, NR NB, 5G NB, network node, gNB, access point (AP), transmission reception point (TRP), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, MIMO antenna technology, and carrier aggregation.

However, as the demand for mobile broadband access continues to increase, there exists a need for further improvements in LTE and NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for resource allocation patterns for scheduling services, such as reliable low-latency services (e.g., ultra-reliable low-latency communications (URLLC) and other services, in a wireless network, such as new radio (NR) (e.g., a 5G network).

Certain aspects of the present disclosure provide a method for wireless communication that may be performed, for example, by a user equipment (UE). The method generally includes determining a resource allocation pattern that defines resources, from a plurality of configured resource allocation patterns, wherein at least one of the plurality of configured resource allocation patterns comprises a plurality of resource elements with at least a first resource element associated with a first resource allocation restriction and at least a second resource element associated with a second resource allocation restriction and communicating based on the determined resource allocation pattern.

Certain aspects of the present disclosure provide an apparatus for wireless communication, such as a UE. The apparatus generally includes means for determining a resource allocation pattern that defines resources, from a plurality of configured resource allocation patterns, wherein at least one of the plurality of configured resource allocation patterns comprises a plurality of resource elements with at least a first resource element associated with a first resource allocation restriction and at least a second resource element associated with a second resource allocation restriction, and means for communicating based on the determined resource allocation pattern.

Certain aspects of the present disclosure provide an apparatus for wireless communication, such as a UE. The apparatus generally includes at least one processor coupled with a memory and configured to determine a resource allocation pattern that defines resources, from a plurality of configured resource allocation patterns, wherein at least one of the plurality of configured resource allocation patterns comprises a plurality of resource elements with at least a first resource element associated with a first resource allocation restriction and at least a second resource element associated with a second resource allocation restriction, and a transceiver configured to communicate based on the determined resource allocation pattern.

Certain aspects of the present disclosure provide a computer readable medium having computer executable code stored thereon for wireless communications by a UE. The code generally includes code for determining a resource allocation pattern that defines resources, from a plurality of configured resource allocation patterns, wherein at least one of the plurality of configured resource allocation patterns comprises a plurality of resource elements with at least a first resource element associated with a first resource allocation restriction and at least a second resource element associated with a second resource allocation restriction, and code for communicating based on the determined resource allocation pattern.

Certain aspects of the present disclosure provide a method for wireless communication that may be performed, for example, by a base station (BS). The method generally includes determining a resource allocation pattern, from a plurality of resource allocation patterns configured for a UE, that defines resources for communicating, wherein at least one of the plurality of configured resource allocation patterns comprises a plurality of resource elements with at least a first resource element associated with a first resource allocation restriction and at least a second resource element associated with a second resource allocation restriction; providing an indication to the UE of the resource allocation pattern to use for communicating; and communicating based on the determined resource allocation pattern.

Certain aspects of the present disclosure provide an apparatus for wireless communication, such as a BS. The apparatus generally includes means for determining a resource allocation pattern, from a plurality of resource allocation patterns configured for a UE, that defines resources for communicating, wherein at least one of the plurality of configured resource allocation patterns comprises a plurality of resource elements with at least a first resource element associated with a first resource allocation restriction and at least a second resource element associated with a second resource allocation restriction; means for providing an indication to the UE of the resource allocation pattern to use for communicating; and means for communicating based on the determined resource allocation pattern.

Certain aspects of the present disclosure provide an apparatus for wireless communication, such as a BS. The apparatus generally includes at least one processor coupled with a memory and configured to determine a resource allocation pattern, from a plurality of configured resource allocation patterns for a UE, that defines resources for communicating, wherein at least one of the plurality of configured resource allocation patterns comprises a plurality of resource elements with at least a first resource element associated with a first resource allocation restriction and at least a second resource element associated with a second resource allocation restriction; and a transceiver configured to provide an indication to the UE of the resource allocation pattern to use for communicating and communicate based on the determined resource allocation pattern.

Certain aspects of the present disclosure provide a computer readable medium having computer executable code stored thereon for wireless communications by a UE. The code generally includes code for determining a resource allocation pattern, from a plurality of resource allocation patterns configured for a UE, that defines resources for communicating, wherein at least one of the plurality of configured resource allocation patterns comprises a plurality of resource elements with at least a first resource element associated with a first resource allocation restriction and at least a second resource element associated with a second resource allocation restriction; code for providing an indication to the UE of the resource allocation pattern to use for communicating; and code for communicating based on the determined resource allocation pattern To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
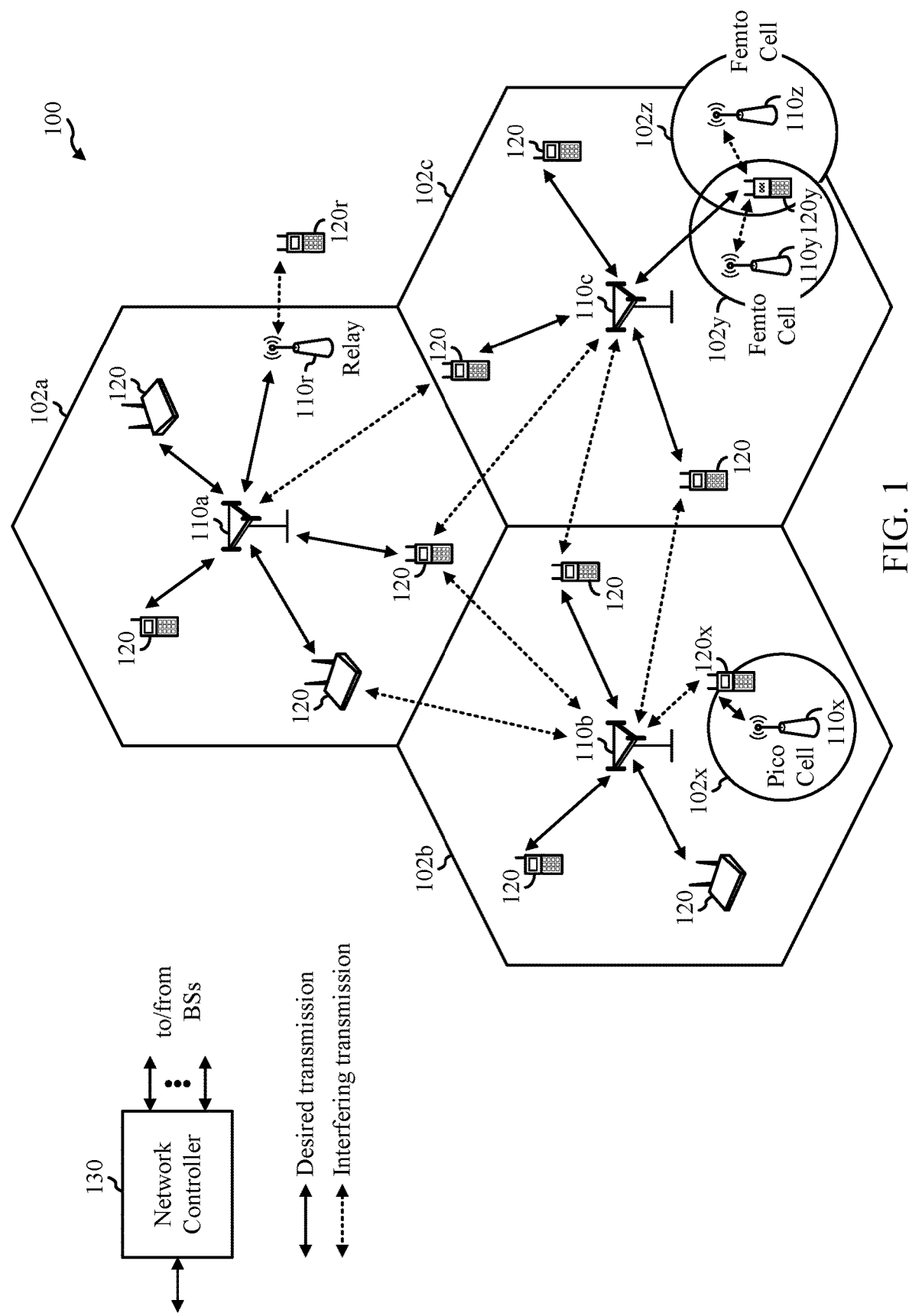
FIG. 1 is a block diagram conceptually illustrating an example wireless communication system, in accordance with certain aspects of the present disclosure.

Aspects of the present disclosure provide apparatus, methods, processing systems, and computer program products for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC).

Aspects of the present disclosure provide techniques and apparatus for performing resource allocation for NR. For example, techniques are provided for resource allocation patterns for scheduling services, such that other services (e.g., URLLC) are protected.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication system 100 in which aspects of the present disclosure may be performed. For example, wireless communication system 100 may be a new radio (NR) or 5G network. Wireless communication system 100 may include user equipment (UEs) 120 configured to determine a resource allocation pattern that defines first resources, from a plurality of configured resource allocation patterns, for use in communicating. Wireless communication system 100 may include base station (BS) 110 configured to perform complementary operations to the operations performed by the UE 120. For example, BS 110 may determine a resource allocation pattern that defines resources, from the plurality of resource allocation patterns configured for the UE 120, wherein at least one of the plurality of configured resource allocation patterns comprises a plurality of resource elements with at least a first resource element associated with a first resource allocation restriction and at least a second resource element associated with a second resource allocation restriction, and provide an indication of the resource allocation pattern to the UE 120 and/or configure the UE 120 with the resource allocation pattern(s). UE 120 and BS 110 may communicate according to the determined resource allocation pattern.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

As illustrated in FIG. 1, wireless communication system 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, eNB, 5G NB, AP, NR BS, transmission reception point (TRP), etc. may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in wireless communication system 100 through various types of backhaul interfaces such as a direct physical connection, a virtual network, or the like using any suitable transport network.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

Wireless communication system 100 may also include relay stations. A relay station is a station that receives a transmission of data and/or other information from an upstream station (e.g., a BS 110 or a UE 120) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication system 100 may be a heterogeneous network that includes BSs of different types, e.g., macro BS, pico BS, femto BS, relays, etc. These different types of BSs may have different transmit power levels, different coverage areas, and different impact on interference in the wireless communication system 100. For example, macro BS may have a high transmit power level (e.g., 20 Watts) whereas pico BS, femto BS, and relays may have a lower transmit power level (e.g., 1 Watt).

Wireless communication system 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless communication system 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block' (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

Figure 2:
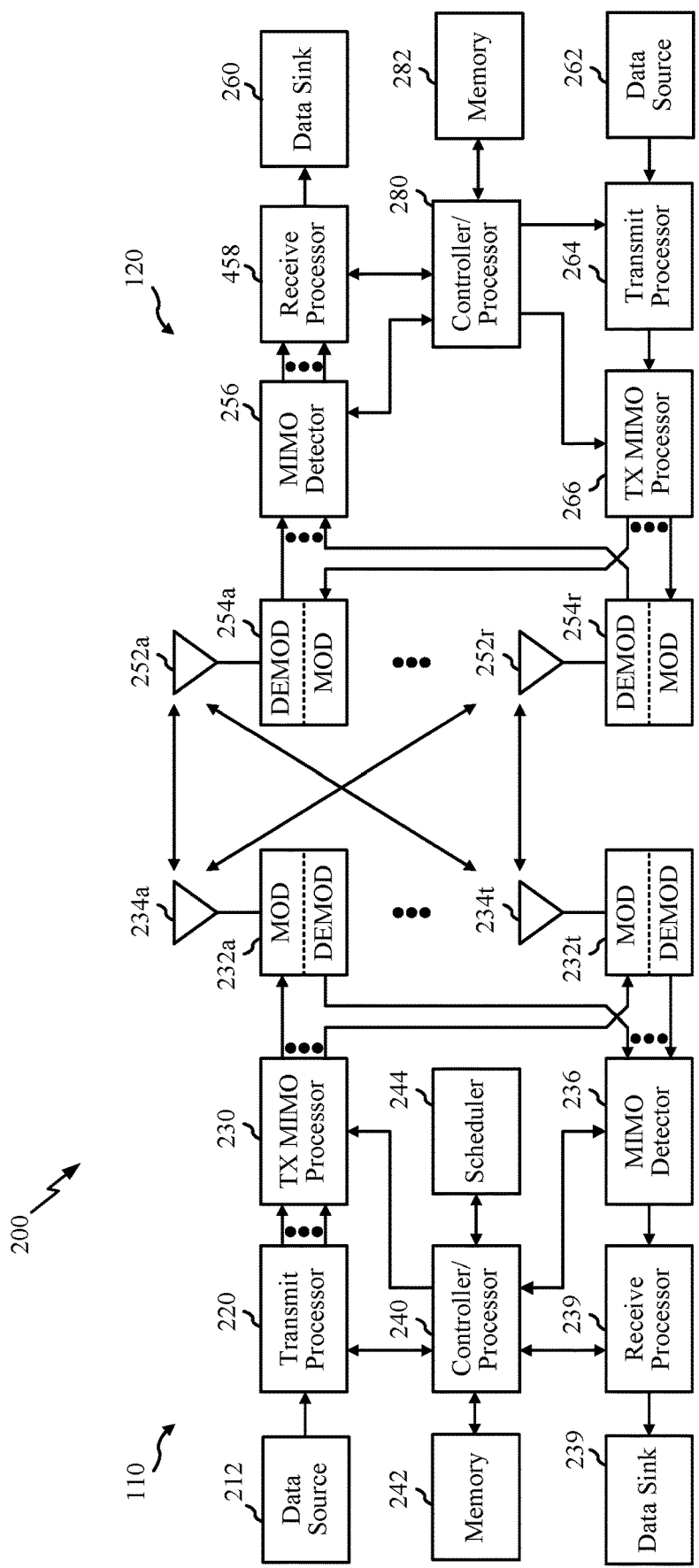
FIG. 2 is a block diagram conceptually illustrating a design of an example base station (BS) and user equipment (UE), in accordance with certain aspects of the present disclosure.

FIG. 2 illustrates example components of BS 110 and UE 120 illustrated in FIG. 1, which may be used to implement aspects of the present disclosure. For a restricted association scenario, BS 110 may be the macro BS 110c in FIG. 1, and UE 120 may be the UE 120y. BS 110 may also be a BS of some other type. BS 110 may be equipped with antennas 234a through 234t, and the UE 120 may be equipped with antennas 252a-252r. One or more components of BS 110 and/or UE 120 may be used to practice aspects of the present disclosure. For example, antennas 252, DEMOD/MOD 254a-254r, processors 266, 258, 264, and/or controller/processor 280 of the UE 120 and/or antennas 234a-234t, MOD/DEMOD 232a-234t, processors 260, 220, 238, and/or controller/processor 240 of BS 110 may be used to perform the operations described herein and illustrated with reference to FIGS. 7-8.

At BS 110, a transmit processor 220 may receive data from a data source 212 and control information from a controller/processor 240. The control information may be for the PBCH, PCFICH, PHICH, PDCCH, etc. The data may be for the PDSCH, etc. The processor 220 may process (e.g., encode and symbol map) the data and control information to obtain data symbols and control symbols, respectively. The processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-432t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a-232t may be transmitted via the antennas 234a-234t, respectively.

At UE 120, the antennas 252a-252r may receive the downlink signals from BS 110 and may provide received signals to the demodulators (DEMODs) 254a-254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the PUSCH) from a data source 262 and control information (e.g., for the PUCCH) from the controller/processor 280. The transmit processor 464 may also generate reference symbols for a reference signal. The symbols from the transmit processor 264 may be precoded by a TX MIMO processor 266 if applicable, further processed by the demodulators 254a-254r (e.g., for SC-FDM, etc.), and transmitted to BS 110. At BS 110, the uplink signals from UE 120 may be received by the antennas 234, processed by the modulators 232, detected by a MIMO detector 236 if applicable, and further processed by a receive processor 238 to obtain decoded data and control information sent by UE 120. The receive processor 238 may provide the decoded data to a data sink 239 and the decoded control information to the controller/processor 240.

The controllers/processors 240 and 280 may direct the operation at BS 110 and UE 120, respectively. The processor 240 and/or other processors and modules at BS 110 may perform or direct, e.g., the execution of the functional blocks illustrated in FIG. 8, and/or other processes for the techniques described herein. The processor 280 and/or other processors and modules at the UE 120 may also perform or direct, e.g., the execution of the functional blocks illustrated in FIG. 7, and/or other processes for the techniques described herein. The memories 242 and 282 may store data and program codes for the BS 110 and the UE 120, respectively. A scheduler 244 may schedule UEs for data transmission on the downlink and/or uplink.

Example NR/5G RAN Architecture

While aspects of the examples described herein may be associated with LTE technologies, aspects of the present disclosure may be applicable with other wireless communications systems, such as new radio (NR) or 5G technologies.

NR may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz or beyond), massive MTC (mMTC) targeting non-backward compatible MTC techniques, and/or mission critical (MiCr) targeting ultra-reliable low-latency communications (URLLC) service.

A single component carrier bandwidth of 100 MHZ may be supported. NR resource blocks (RBs) may span 12 subcarriers with a subcarrier bandwidth of 75 kHz over a 0.1 ms duration. Each radio frame may consist of 50 subframes (or slots) with a length of 10 ms. Consequently, each subframe may have a length of 0.2 ms. Each subframe may indicate a link direction (i.e., downlink, uplink or sidelink) for data transmission and the link direction for each subframe may be dynamically switched. Each subframe may include DL/UL data as well as DL/UL control data. UL and DL subframes for NR may be as described in more detail below with respect to FIG. 5 and FIG. 6.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) or distributed units (DUs).

The NR radio access network (RAN) may include a CU and one or more DUs. A NR BS (e.g., referred to as a gNB, 5G Node B, NB, eNB, transmission reception point (TRP), access point (AP), etc.) may correspond to one or multiple BSs. NR cells can be configured (e.g., by the RAN) as access cells (ACells) or data only cells (DCells). DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
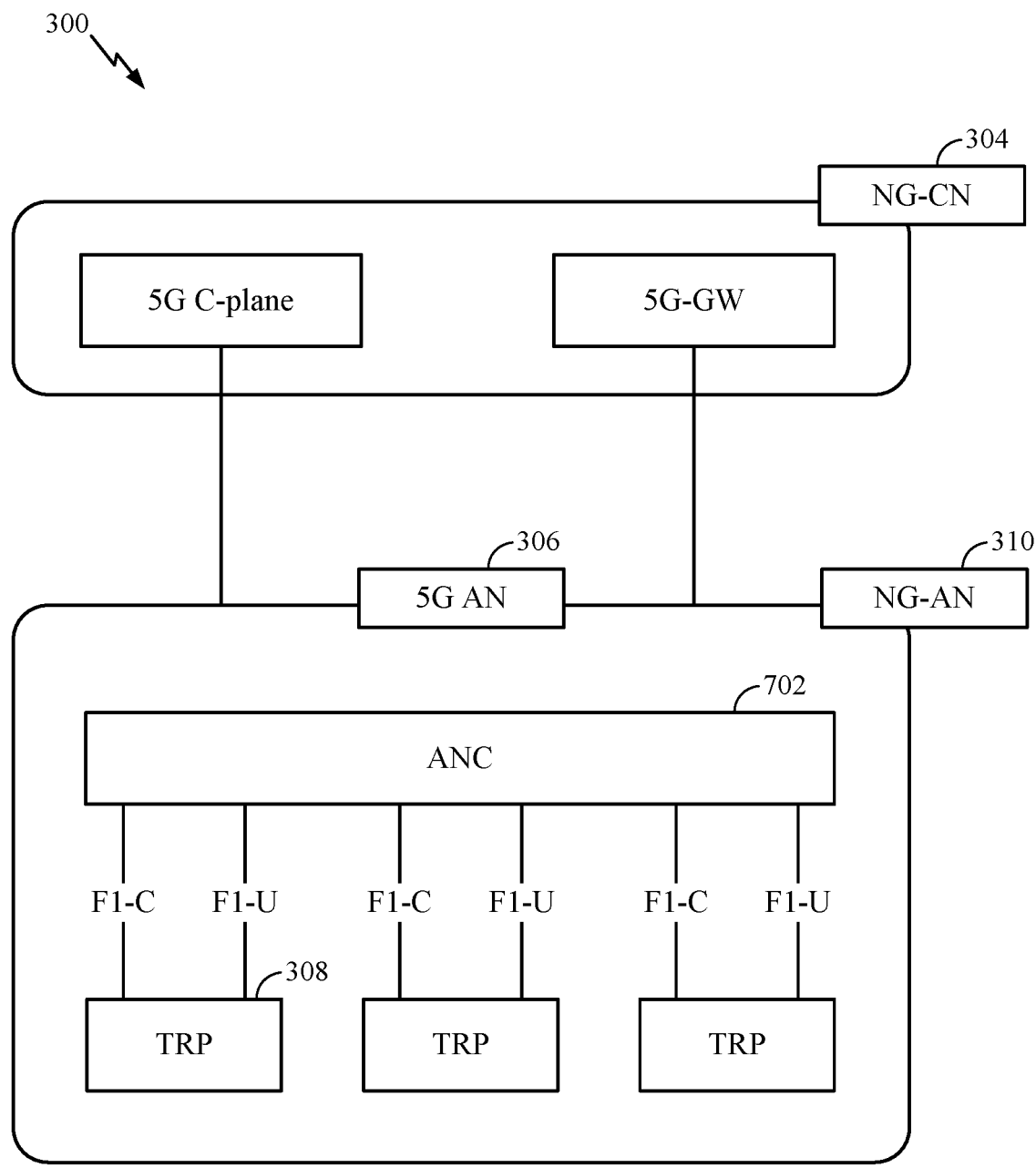
FIG. 3 illustrates an example logical architecture of a distributed radio access network (RAN), in accordance with certain aspects of the present disclosure.

FIG. 3 illustrates an example logical architecture of a distributed RAN 300, according to aspects of the present disclosure. A 5G access node 306 may include an access node controller (ANC) 302. ANC 302 may be a CU of the distributed RAN 300. The backhaul interface to the next generation core network (NG-CN) 304 may terminate at ANC 302. The backhaul interface to neighboring next generation access nodes (NG-ANs) 310 may terminate at ANC 302. ANC 302 may include one or more TRPs 308

TRPs 308 may be a DU. TRPs 308 may be connected to one ANC (e.g., ANC 302) or more than one ANC (not illustrated). For example, for RAN sharing, radio as a service (RaaS), and service specific AND deployments, the TRP may be connected to more than one ANC. A TRP may include one or more antenna ports. TRPs 308 may be configured to individually (e.g., dynamic selection) or jointly (e.g., joint transmission) serve traffic to a UE.

The logical architecture of the distributed RAN 300 may support fronthauling solutions across different deployment types. For example, the architecture may be based on transmit network capabilities (e.g., bandwidth, latency, and/or jitter). The logical architecture of the distributed RAN 300 may share features and/or components with LTE. For example, the NG-AN 310 may support dual connectivity with NR. NG-AN 310 may share a common fronthaul for LTE and NR.

The logical architecture of distributed RAN 300 may enable cooperation between and among TRPs 308. For example, cooperation may be within a TRP and/or across TRPs via ANC 302. An inter-TRP interface may not be present.

The logical architecture of a distributed RAN 300 may include a dynamic configuration of split logical functions.

For example, packet data convergence protocol (PDCP), radio link control (RLC) protocol, and/or medium access control (MAC) protocol may be adaptably placed at ANC 302 or TRP 308.

Figure 4:
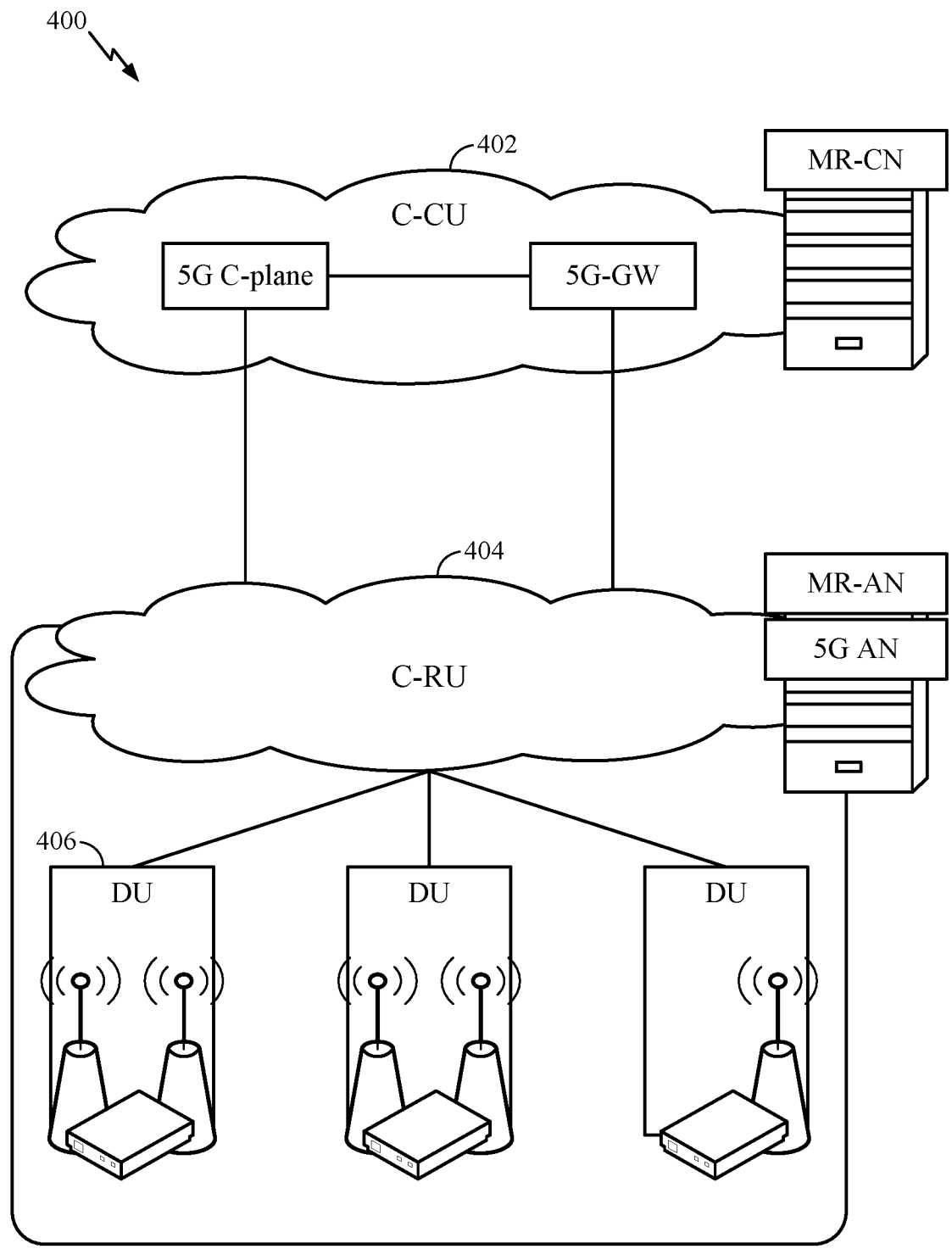
FIG. 4 illustrates an example physical architecture of a distributed RAN, in accordance with certain aspects of the present disclosure.

FIG. 4 illustrates an example physical architecture of a distributed RAN 400, according to aspects of the present disclosure. A centralized core network unit (C-CU) 402 may host core network functions. C-CU 402 may be centrally deployed. C-CU 402 functionality may be offloaded (e.g., to advanced wireless services (AWS)), in an effort to handle peak capacity. A centralized RAN unit (C-RU) 404 may host one or more ANC functions. Optionally, C-RU 404 may host core network functions locally. C-RU 404 may have distributed deployment. C-RU 404 may be located near the network edge. DU 406 may host one or more TRPs. DU 406 may be located at edges of the network with radio frequency (RF) functionality.

Figure 5:
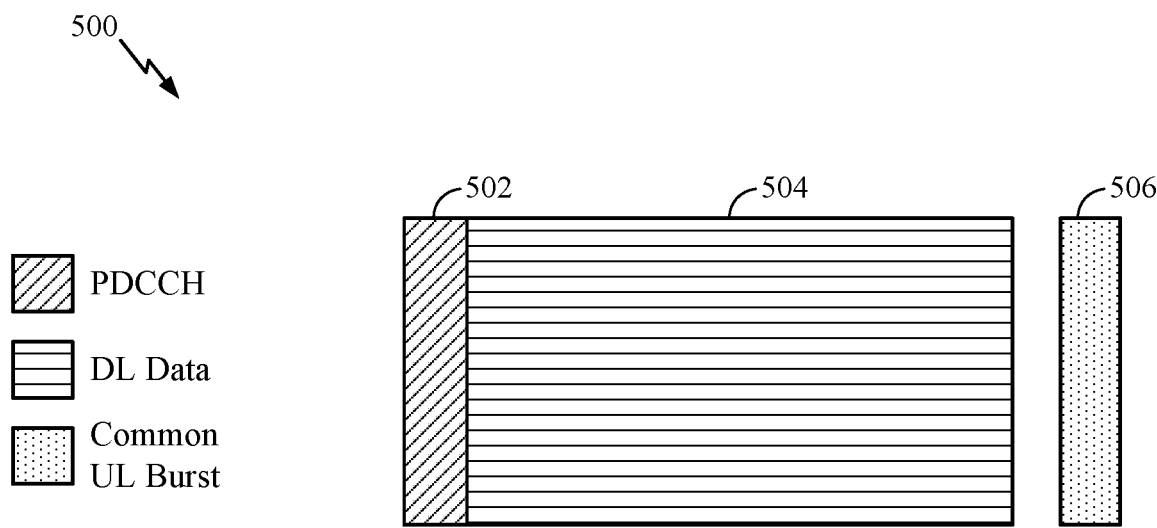
FIG. 5 is a diagram illustrating an example of a downlink-centric slot, in accordance with certain aspects of the present disclosure.

FIG. 5 is a diagram showing an example of a DL-centric slot 500. DL-centric slot 500 may include a control portion 502. The control portion 502 may exist in the initial or beginning portion of DL-centric slot 500. The control portion 502 may include various scheduling information and/or control information corresponding to various portions of DL-centric slot 500. In some configurations, the control portion 502 may be a physical DL control channel (PDCCH), as shown in FIG. 5. DL-centric slot 500 may also include a DL data portion 504. The DL data portion 504 may be referred to as the payload of DL-centric slot 500. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

DL-centric slot 500 may also include a common UL portion 506. The common UL portion 506 may sometimes be referred to as an UL burst, a common UL burst, and/or various other suitable terms. The common UL portion 506 may include feedback information corresponding to various other portions of DL-centric slot 500. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information. As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric slot and alternative structures having similar features may exist without necessarily deviating from the aspects described herein.

Figure 6:
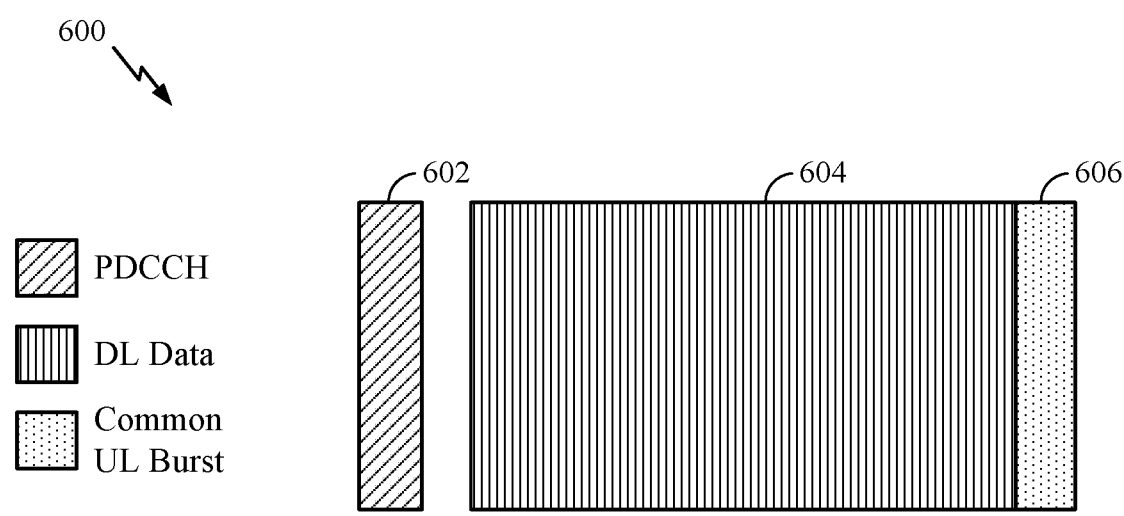
FIG. 6 is a diagram illustrating an example of an uplink-centric slot, in accordance with certain aspects of the present disclosure.

FIG. 6 is a diagram showing an example of an UL-centric slot 600. UL-centric slot 600 may include a control portion 602. The control portion 602 may exist in the initial or beginning portion of UL-centric slot 600. The control portion 602 in FIG. 6 may be similar to the control portion 602 described above with reference to FIG. 6. UL-centric slot 600 may also include an UL data portion 604. The UL data portion 604 may sometimes be referred to as the payload of UL-centric slot 600. The UL portion may refer to the communication resources utilized to communicate UL data from the subordinate entity (e.g., UE) to the scheduling entity (e.g., UE or BS). In some configurations, the control portion 602 may be a physical UL shared channel (PUSCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). UL-centric slot 600 may also include a common UL portion 606. The common UL portion 606 in FIG. 6 may be similar to the common UL portion 606 described above with reference to FIG. 6. The common UL portion 606 may additionally or alternatively include information pertaining to channel quality indicator (CQI), sounding reference signals (SRSs), and various other suitable types of information. The foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Resource Allocation Patterns for Scheduling Services in a Wireless Network As described above, certain systems (e.g. such as wireless communication system 100) may be new radio (NR) systems (e.g., configured to operate according a wireless standard, such as 5G)) that support various wireless communication services such as, for example, enhanced mobile broadband (eMBB) service targeting wide bandwidth (e.g. 80 MHz beyond), millimeter wave (mmW) service targeting high carrier frequency (e.g. 60 GHz), massive machine type communications (mMTC) service targeting non-backward compatible MTC techniques, and/or mission critical (MiCr) service targeting ultra-reliable low-latency communications (URLLC). These services may be associated with latency and reliability requirements, may be associated different transmission time intervals (TTI) to meet the quality of service (QoS) requirements. In addition, these services may co-exist in the same subframe Latency in a network may refer to the amount of time for a packet of data to get from one point in the network to another point in the network. In some example, URLLC (MiCr service) may target a latency of 0.5 ms; eMBB may target 4 ms latency; and mMTC may target 10 seconds (e.g., for a 20 byte uplink application packet or 105 bytes at the PHY layer with uncompressed IP headers) at 164 dB minimum coupling loss (MCL). Reliability in a network may refer to a probability of successfully transmitting X number of bytes within 1 ms at a certain channel quality. For example, reliability for URLLC may target a block error rate (BLER) of $10^{-3}$.

Avoiding or minimizing the impact of interference between uplink transmissions of reliable low latency services, are desirable to help meet the reliability and latency requirements when such services are operating together on a wireless network. For example, it may be desirable to protect resources used for URLLC transmissions, particularly in cases where uplink transmission between multiple wireless devices may not be easily punctured. Low-latency services typically need to be transmitted and received quickly as delays increase the latency of the services. As uplink slots are typically assigned multiple milliseconds in advance, it may be difficult to schedule or reschedule uplink assignments fast enough to adequately meet latency requirements (e.g., 0.5 ms). For example, where a different service (e.g., such as eMBB and/or mMTC) is multiplexed with URLLC, it is desirable to reschedule the regular service whenever there is a URLLC transmission. In the downlink direction, this can be achieved by puncturing downlink eMBB data with URLLC, but on the uplink, the eMBB data is typically scheduled ahead of time, so such dynamic puncturing may be challenging.

For eMBB service scheduling, link efficiency may be important. If too many resources are reserved for URLLC, less resources are available for eMBB service, which can result in inefficient resource usage. On the other hand, even if URLLC communications puncture eMBB services, the punctured resources may be still subject to inter-cell interference from other cells, which may make it difficult to meet the stringent QoS targets for URLLC service.

For mMTC scheduling or other services that use coverage enhancement (e.g., such as voice over Internet protocol (VoIP)), a single transport block (e.g., packet) may have a time span (TTI) of multiple subframes (e.g., up to one second or longer). Such long-TTI transmissions, if contiguous, may cause inter-cell interference to other services including URLLC.

Accordingly, techniques for scheduling resource for different wireless communication services in a wireless network, such as NR, are desirable.

Aspects of the present disclosure provide resource allocation patterns for scheduling services, such as reliable low-latency services (e.g., URLLC) and other services, in a wireless network, such as (NR (e.g., a 5G network).

Figure 7:
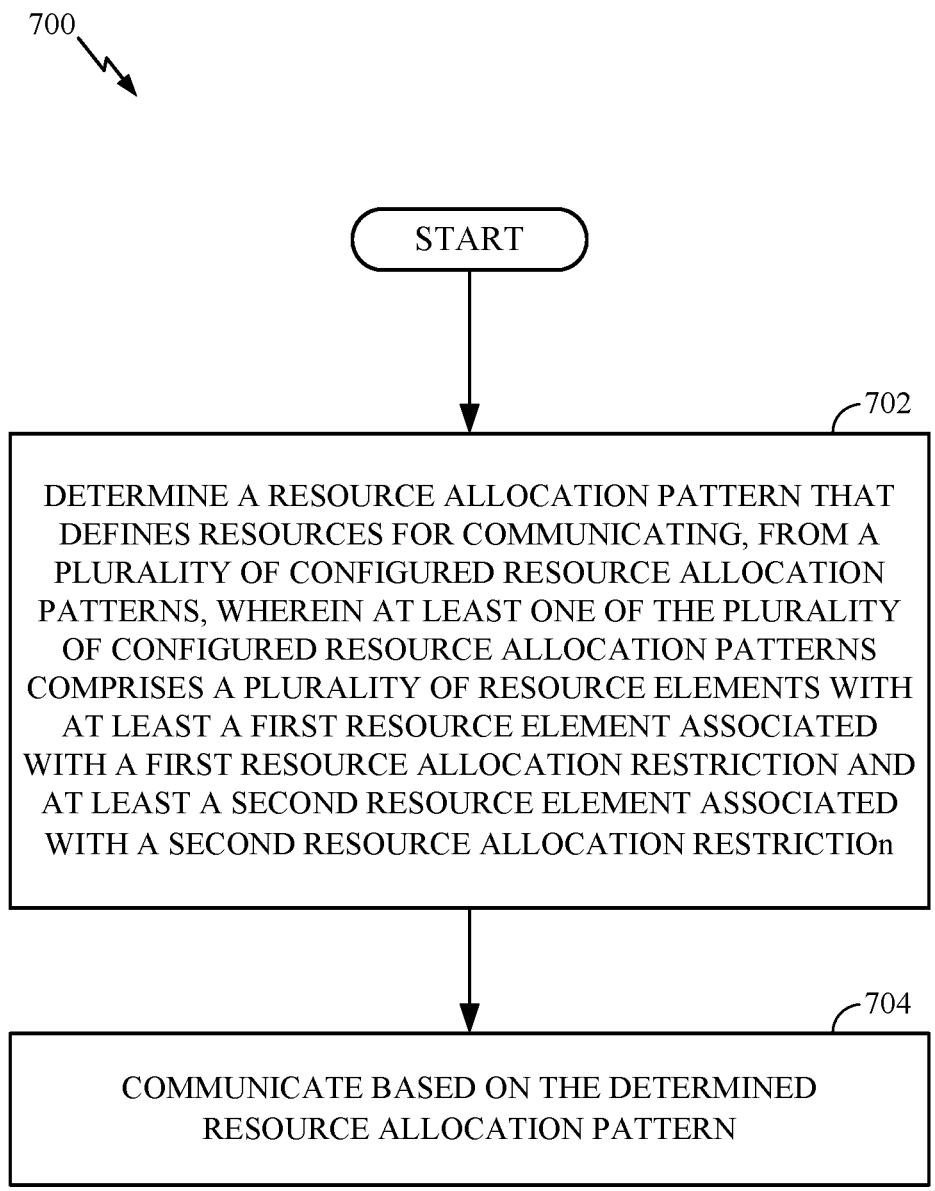
FIG. 7 is a flowchart illustrating example operations for wireless communications by a UE, in accordance with certain aspects of the present disclosure.

FIG. 7 is flowchart illustrating example operations 700 for wireless communications, in accordance with certain aspects of the present disclosure. Operations 700 may be performed, for example, by a UE (e.g., UE 120). Operations 700 may begin at 702 by determining a resource allocation pattern that defines resources, from a plurality of configured resource allocation patterns, wherein at least one of the plurality of configured resource allocation patterns comprises a plurality of resource elements with at least a first resource element associated with a first resource allocation restriction and at least a second resource element associated with a second resource allocation restriction. At 704, the UE communicates based on the determined resource allocation pattern.

Figure 8:
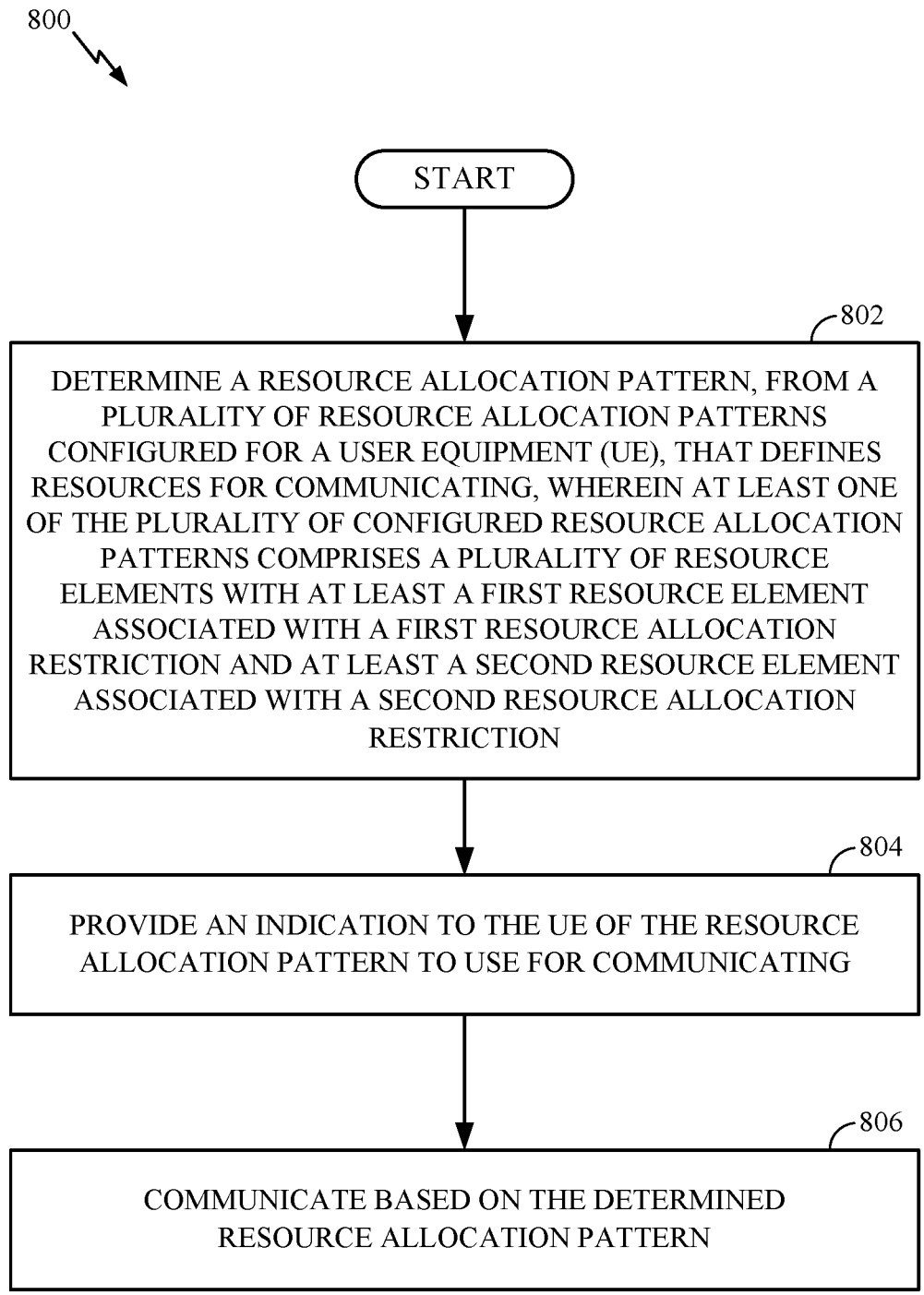
FIG. 8 is a flowchart illustrating example operations for wireless communications by a BS, in accordance with certain aspects of the present disclosure.

FIG. 8 is flowchart illustrating example operations 800 for wireless communications, in accordance with certain aspects of the present disclosure. Operations 800 may be performed, for example, by a BS (e.g., BS 110). Operations 8—may be complementary operations by the BS to the operations 700 by the UE. Operations 800 may begin at 802 by determining a resource allocation pattern, from a plurality of configured resource allocation patterns configured for a UE, that defines resource for communicating, wherein at least one of the plurality of configured resource allocation patterns comprises a plurality of resource elements with at least a first resource element associated with a first resource allocation restriction and at least a second resource element associated with a second resource allocation restriction. At 804, the BS provides an indication to the UE of the resource allocation pattern to use for communicating. At 806, the BS communicates based on the determined resource allocation pattern.

Example Resource Allocation Patterns

According to certain aspects, a plurality of different resource allocations patterns may be defined and configured for the UE (e.g., a UE 120). One of the configured resource allocation patterns may be indicated for a UE (e.g., by a BS 110) to use for particular communications. The resource allocation patterns may define resource allocation restrictions for different resource elements. As will be described in more detail below, the resource allocation pattern may indicate resources at a granularity of symbols, tones, resource blocks, etc. The resource allocation pattern may indicate resources that can be used or not used (e.g., ON/OFF) by the UE or can indicate various power levels that can be used for particular resources. The resource allocation patterns may be semi-statically signaled, configured, or dynamically determined/signaled. Separate (e.g., different) resource allocation patterns may be indicated for different services, different subframes, different UEs, different carriers, different channels, etc. For example, the resource allocation patterns may be selected/determined/signaled in order to minimize interference, for example, to URLLC service, and/or interference, for example, from mMTC service.

Example ON/OFF Resource Allocation Pattern

Figure 9:
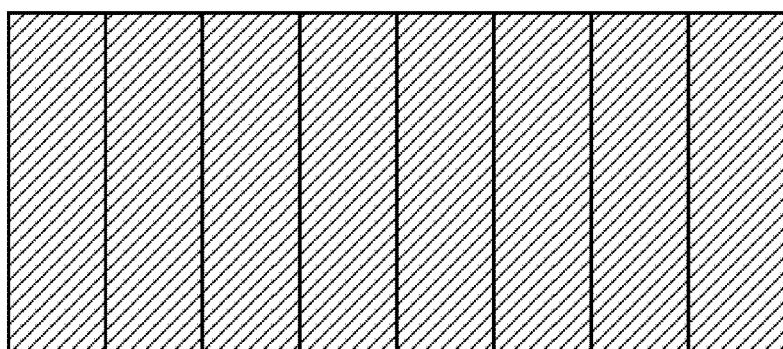
FIGS. 9-9B illustrate example ON/OFF resource allocation patterns at a symbol level granularity, in accordance with certain aspects of the present disclosure.
Figure 9A:
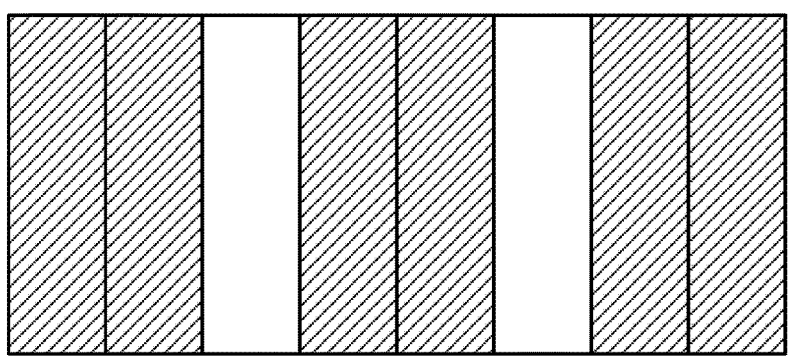
Figure 9B:
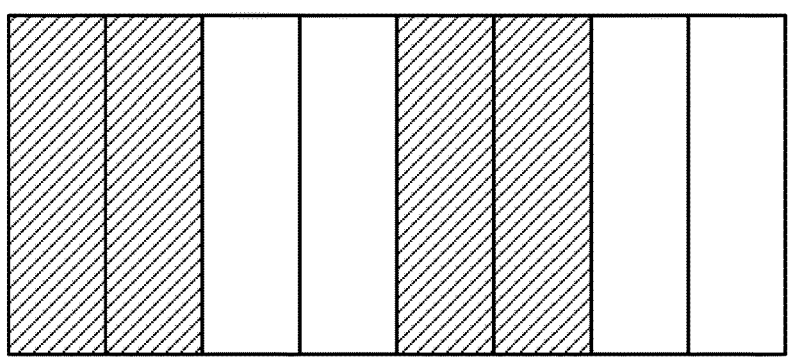

FIGS. 9-9B illustrate example ON/OFF resource allocation patterns at a symbol level granularity, in accordance with certain aspects of the present disclosure. In FIGS. 9-9B, an 8-symbol resource allocation pattern is used. In aspects, resource allocation patterns may be defined for different durations (e.g., different numbers of symbols).

In FIGS. 9-9B, the resource allocation patterns are defined at the symbol-level granularity. The resource allocation patterns indicate symbols that may be used by a UE for a particular communication and symbols that are not allocated (e.g., excluded) for the UE to use for that communication. This may be referred to as an ON/OFF resource allocation pattern. As will be discussed in greater detail below, different resource allocation granularities may be used (e.g., tone, resource block, etc.) and different patterns may be used, for example, rather than an ON/OFF pattern, levels of usage may be defined for particular resources in the resource allocation patterns.

In FIG. 9, an example of a contiguous resource allocation pattern 900 is shown where only contiguous symbols are allocated for use. In FIGS. 9A and 9B, examples of non-contiguous resource allocation patterns are shown (or hybrid contiguous and non-contiguous). In FIG. 9A, a 2-ON, 1-OFF, resource allocation pattern 900A is illustrated. With this pattern, URLLC communications having a 1-symbol TTI may have protected resources every three symbols (e.g., the OFF symbols). FIG. 9B shows another example non-contiguous resource allocation pattern 900B having a 2-ON, 2-OFF, resource allocation pattern. With this pattern, URLLC communications having a 2-symbol TTI can have two symbols of protected resources every 4 symbols.

Although not shown in FIGS. 9-9B, other ON/OFF resource allocation patterns may be defined/configured using different combinations of ON/OFF symbols, different numbers of symbols, transmit time intervals (TTIs), slots, subframes, etc., and/or different resource granularities (e.g., tone, RBs, etc.).

Example Usage-Level Resource Allocation Patterns

According to certain aspects, rather than (or in combination with) an ON/OFF resource allocation pattern, a level of usage may be defined (e.g., determined, signaled, indicated, configured, etc.) for a resource allocation pattern. The level of usage may be defined for various granularities (e.g., symbols, TTIs slots, subframes, tones, and/or RBs, etc.). The usage may be a power level that may be used by the UE for a particular communications on the particular resource.

Figure 10:
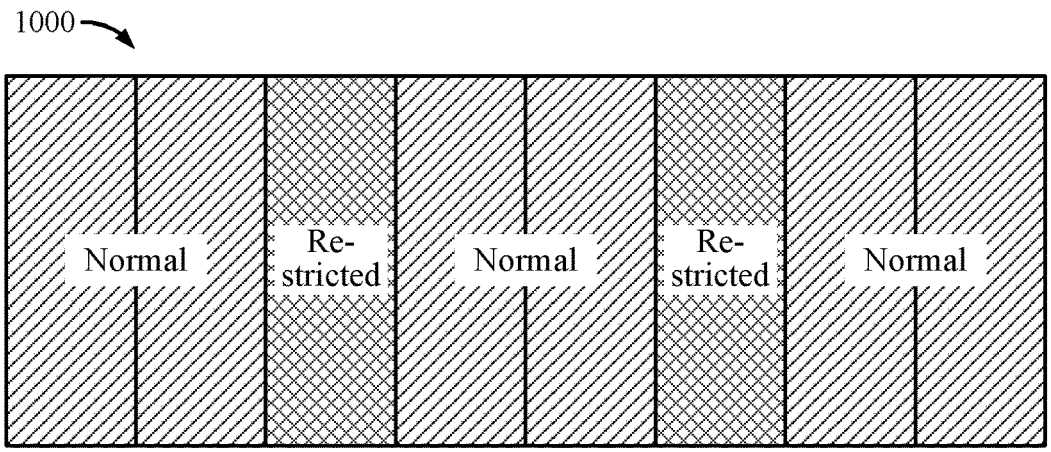
FIGS. 10-10A illustrate example resource allocation patterns indicating power levels for symbols, in accordance with certain aspects of the present disclosure.
Figure 10A:
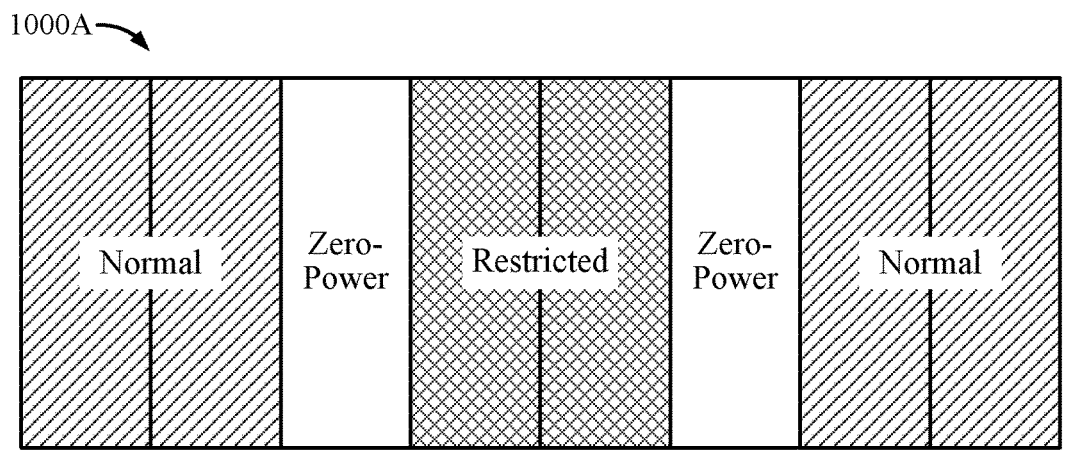

FIGS. 10-10A illustrate example resource allocation patterns indicating power levels that may be used for the symbols in the resource allocation pattern, in accordance with certain aspects of the present disclosure. As shown in FIG. 10, in one example resource allocation pattern 1000, two different power levels may be indicated for different resources—a normal power level (e.g., unrestricted) or a restricted (e.g., reduced) power level. In the example resource allocation pattern 1000, the UE may use the normal power level in two symbols, followed by a restricted power level in the next symbol.

As shown in FIG. 10A, in another example resource allocation pattern 1000A, three different power levels may be indicated for different resources—the normal power level (e.g., unrestricted), the restricted (e.g., reduced) power level, and a zero-power level (e.g., OFF). In the example resource allocation pattern 1000A, the UE may use the normal power level in two symbols, followed by a zero-power level in the next symbol, followed by a restricted power level in the next two symbols.

Figure 10B:
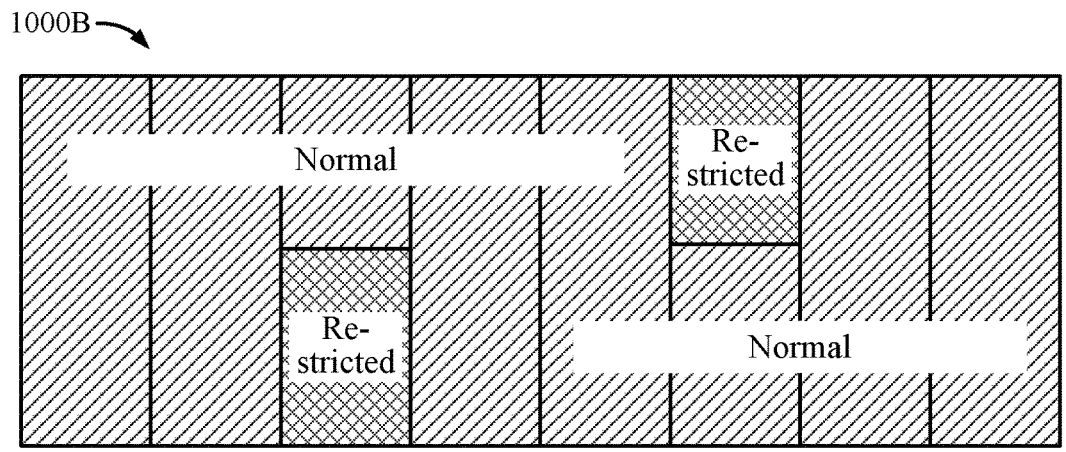
FIG. 10B illustrates an example resource allocation pattern indicating power levels for symbols and tones within a symbol, in accordance with certain aspects of the present disclosure.

According to certain aspects, a resource allocation pattern may be defined/configured that indicates power level usages for resources in two dimensions (e.g., time and frequency). For example, resource allocation patterns may be defined/configured that indicate power level usage for different symbols and for different frequency resources (e.g., tones) within the symbols. FIG. 10B illustrates an example resource allocation pattern 1000B, in which two different power levels may be indicated for different resources—a normal power level (e.g., unrestricted) or a restricted (e.g., reduced) power level. As shown in FIG. 10B, within in some symbols, certain frequency resources are indicated one usage level and other frequency resources are indicated a different usage level.

According to certain aspects, although not shown in FIGS. 10-10B, different combinations/patterns of usage levels, time resources, and frequency resources may be defined/configured for resource allocation. For example, more than three power levels could be indicated for different resources. Also, different combinations of single-dimensional and/or two-dimensional resources may be used for a resource allocation pattern with any combinations of resource usage levels associated with the particular resources.

According to certain aspects, the resource usage levels (e.g., power levels) may be signaled to the UE, predetermined, and/or blindly detected.

Example Resource Block Level Granularity Resource Allocation Patterns

Figure 11:
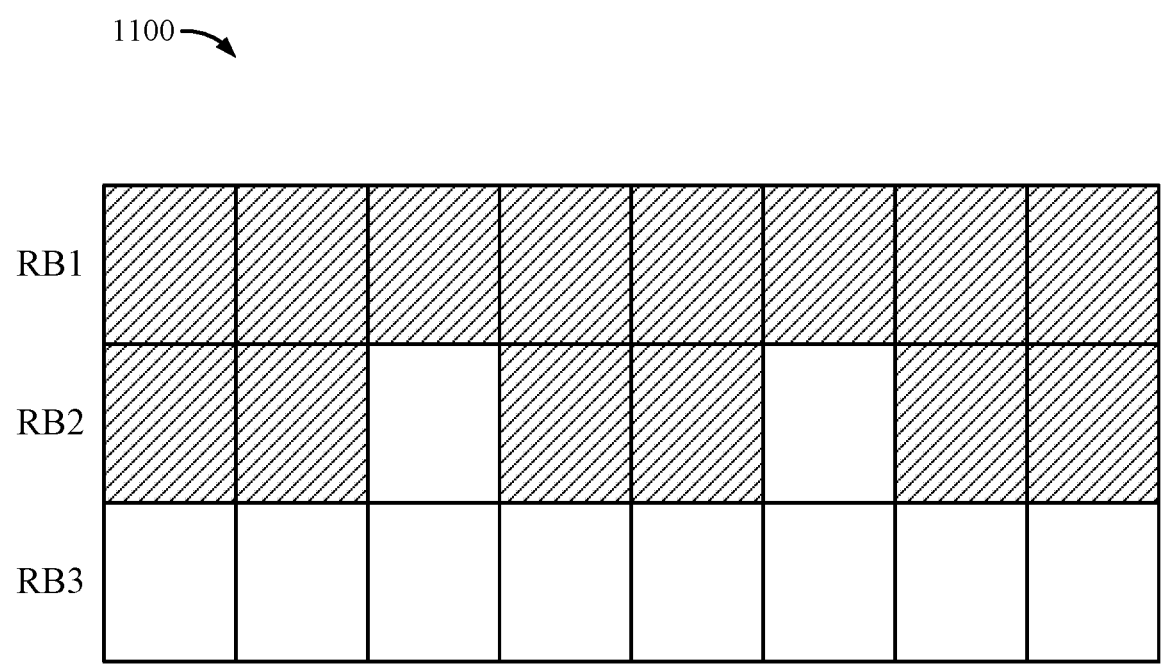
FIG. 11 illustrates an example resource allocation pattern at a resource block level granularity, in accordance with certain aspects of the present disclosure.

As mentioned above, resource allocation patterns may be defined/configured/indicated at various resource granularity levels. According to certain aspects, resource allocation patterns may be defined at the resource block (RB) level. The resource allocation pattern may be defined per-subband, per-RB, or per-set of RBs to indicate RBs that may be used or not used (or levels of resource usage) for a particular communication. As illustrated in FIG. 11, this may also be combined with symbol (or other time dimension resource) resource allocation.

According to certain aspects, some RBs in some symbols may be reserved. Some RBs may be reserved for forward compatibility (e.g., blank resources). Some RBs may be semi-statically configured or reserved for a particular service, such as mMTC communications. For example, an anchor RB may be defined for mMTC synchronization signals, information transmissions, etc.

Example Indication of Resource Allocation Pattern

According to certain aspects, an indication of the resource allocation pattern (e.g., a particular resource allocation of a plurality of resource allocations configured for the UE) for the UE to use for a particular communication may be provided. The indication may be provided via a semi-static configuration (e.g., higher layer infrequent radio resource control (RRC) signaling), an activation/deactivation message, dynamic signaling, or a combination thereof.

In one example, the UE may be semi-statically configured, via higher layers, with a set of defined resource allocation patterns (e.g., a set of four patterns). The configured resource allocation patterns may be defined according to any of the resource allocation patterns described above (e.g., contiguous, non-contiguous, ON/OFF, usage levels, granularities, etc.) or other resource allocation patterns. The UE may then be sent (e.g., by the BS) an indication (e.g., a 2-bit indicator in the case of four configured resource allocation patterns) of which resource allocation pattern in the configured set of defined resource allocation patterns is to be used for a particular communication.

The indication of the resource allocation pattern to use for the communication may be provided in a control channel (e.g., broadcast, groupcast, or unicast) to indicate the resource allocation pattern for a data transmission that is scheduled by the control channel. As another example, the UE may receive an activation message that activates the resource allocation pattern. In this case, the UE may use the resource allocation pattern (e.g., indefinitely) for communications until a new resource allocation pattern is activated (e.g., by receiving another activation message) or the current resource allocation pattern is released (e.g., by a deactivation message).

Example Selection/Determination of the Resource Allocation Patterns

As described above, different (e.g., a plurality or set of) resource allocation patterns may be defined/configured for the UE. The UE may be configured with or signaled the defined resource allocation patterns and may be indicated (e.g., configured or dynamically signaled) a particular one of the resource allocations patterns to use for a particular communication. According to certain aspects, the BS may determine/select the particular resource allocation pattern to indicate/configure the UE to use based on various parameters. For example, the determination/selection may be UE-dependent, uplink or downlink dependent, component carrier dependent, service type dependent, TTI length dependent, channel dependent, and/or subframe (slot configuration) dependent. According to certain aspects, separate indications of resource allocation patterns may be indicated/configured for different ones of the above parameters.

Example UE-dependent Resource Allocation Patterns

According to certain aspects, the resource allocation pattern may be UE-dependent (e.g., selected based on and/or determined separately for). Transmissions to/from different UEs contributes various amount of inter-cell interference. For example, a UE close to cell-center may cause little or minimal inter-cell interference in the uplink (even if the UE transmits continuous in the uplink). Thus, the resource allocation pattern may be contiguous. Such a UE may be semi-statically with the particular resource allocation pattern. On the downlink, the inter-cell interference may be reasonable small if its downlink transmission is subject to restricted power. Thus, a resource allocation pattern restricting the resource usage level may be used.

Alternatively, a UE at cell-edge may contribute inter-cell interference to other cells for its uplink and downlink transmissions. Similarly, its downlink traffic would also contribute inter-cell interference to other cells. In this case, a non-contiguous resource pattern may be semi-statically and/or dynamically indicated for such as UE.

Example Link-dependent and/or CC-dependent Resource Allocation Patterns

According to certain aspects, the resource allocation pattern may be link dependent. For example, the resource allocation patterns may be separately managed (e.g., determined/selected/indicated/configured) for downlink, uplink, or sideline.

Downlink and uplink may have different channel and interference characteristics, different antenna patterns, different transmission power, etc. For the UE, downlink operations may be different than uplink operations. For example, the UE may be served by a different cell (or set of cells) on the downlink than on the uplink (e.g., in coordinated multipoint (CoMP) operation). Different cells may have different uplink-downlink subframe configurations. Thus, interference characteristics for communication with a UE may be quite different for the downlink and uplink. Accordingly, different resource allocation patterns may be determined (selected/indicated/configured/signaled) for the uplink, downlink, and sidelink directions.

Similarly, the resource pattern may be separately configured for different component carriers (CCs), which may also have different UL/DL subframe configurations.

Example Service Type-dependent and/or TTI Length-dependent Resource Allocation Patterns According to certain aspects, the resource allocation pattern may be dependent on the service type and/or TTI length. The resource allocation patterns may be managed separately for different types of services.

In one example, a first set of resource allocation patterns may be defined and/or selected for eMBB service, a second set of patterns may be defined and/or selected for URLLC service, and a third set of patterns may be defined and/or selected (and configured and/or signaled) for mMTC service.

In one example, the set of patterns for each service may be a function of the TTI length of that service being scheduled. For example, for a very short TTI transmission (e.g., a few symbols), the resource allocation pattern for that communication (e.g., service) may be continuous (e.g., semi-statically configured); for a less short TTI transmission (e.g., 5-14 symbols), the resource allocation pattern may be dynamically indicated from one of four patterns; and for a long TTI transmission (e.g., >14 symbols), the resource allocation pattern may be dynamically indicated from one of two patterns

Example Channel-dependent Resource Allocation Patterns

According to certain aspects, resource allocation patterns may be channel-dependent. The resource allocation patterns may be managed separately for different types of channels. For example, a first resource allocation pattern may be defined and/or selected (and configured and/or signaled) for a control channel, a second resource allocation pattern may be defined and/or selected for eMBB PDSCH, and a third resource allocation pattern may be defined and/or selected for URLLC PDSCH, etc. Some channels (e.g., important channels, broadcast channels, groupcast channels, etc.) may have different treatments. For example, PSS/SSS/PBCH/SIB/MIB (including bundled PSS/SSS/PBCH or other SS) may have a resource allocation pattern that never skips any symbol.

Example Subframe-dependent Resource Allocation Patterns

According to certain aspects, the resource allocation patterns may be subframe-dependent. The resource allocation patterns may be a function of subframe indices. For example, certain services may be valid services may be valid in a subset of subframes, thus, some resource allocation patterns may be applicable only in the subset of subframes. URLLC may be present in a subset of subframes on a particular CC, thus some resource pattern may be applicable only in the subset of subframes on the CC.

According to certain aspects, any combination of the above may be applied for determining the resource allocation patterns for UEs.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
receiving higher layer signaling, from a base station (BS), semi-statically configuring a plurality of resource allocation patterns at the UE, wherein each of the plurality of configured resource allocation patterns indicates a first one or more resources available to use for physical downlink shared channel (PDSCH) communication with the BS and indicates a second one or more resources excluded for PDSCH communication with the BS;

receiving, from the BS, dynamic control signaling indicating at least one of the configured plurality of resource allocation patterns to use for communicating; and communicating based on the indicated at least one resource allocation pattern.

2. The method of claim 1, wherein the indication of the at least one of the configured plurality of resource allocation patterns is based on at least one parameter associated with a transmission.

3. The method of claim 2, wherein the at least one parameter comprises a slot configuration for the transmission.

4. The method of claim 2, wherein the at least one parameter comprises at least one of: whether the transmission is for uplink, downlink, or sidelink; a component-carrier (CC) used for the transmission; a subband used for the transmission; a transmission time interval (TTI) length of the transmission; a channel used for the transmission;
 a subframe used for the transmission; or a location of the UE in a cell.

5. The method of claim 1, wherein the first one or more resources and the second one or more resources are associated with different frequency resources in a same symbol.

6. The method of claim 1, wherein the first one or more resources is associated with a first symbol and the second one or more resources is associated with a second symbol, and wherein the second symbol is different from the first symbol.

7. The method of claim 1, wherein each of the plurality of resource allocation patterns defines a first transmit power higher for a third one or more resources and a second transmit power for a fourth one or more resources.

8. The method of claim 1, wherein the indicated resource allocation pattern is UE-specific.

9. The method of claim 1, wherein each of the resource allocation patterns indicates the first one or more resources and the second one or more resources at a per resource element (RE), per tone, per symbol, or per resource block (RB) granularity.

10. The method of claim 1, wherein the higher layer signaling comprises radio resource control (RRC) signaling.

11. The method of claim 1, wherein the first one or more resources or the second one or more resources are indicated at a resource block level and at a symbol level of granularity.

12. The method of claim 1, wherein the higher layer signaling further indicates a time- domain pattern for the first one or more resources or the second one or more resources.

13. The method of claim 1, wherein the first one or more resources are resources available to use for PDSCH data communication with the BS and the second one or more resources are resources excluded for PDSCH data communication with the BS.

14. An apparatus for wireless communications by a user equipment (UE), comprising:
 a transceiver;
 a memory; and
 at least one processor coupled with the memory and the transceiver, the at least one processor configured to:
  receive higher layer signaling, from a base station (BS), semi-statically configuring a plurality of resource allocation patterns at the UE, wherein each of the plurality of configured resource allocation patterns indicates a first one or more resources available to use for physical downlink shared channel (PDSCH) communication with the BS and indicates a second one or more resource elements excluded for PDSCH communication with the BS;
  receive, from the BS, dynamic control signaling indicating at least one of the configured plurality of resource allocation patterns to use for communicating; and
  communicate based on the indicated at least one resource allocation pattern.

15. The apparatus of claim 14, wherein the higher layer signaling comprises radio resource control (RRC) signaling.

16. The apparatus of claim 14, wherein the first one or more resources or the second one or more resources are indicated at a resource block level and at a symbol level of granularity.

17. The apparatus of claim 14, wherein the higher layer signaling further indicates a time-domain pattern for the first one or more resources or the second one or more resources.

18. The apparatus of claim 14, wherein the first one or more resources are resources available to use for PDSCH data communication with the BS and the second one or more resources are resources excluded for PDSCH data communication with the BS.

19. An apparatus for wireless communications, comprising:
 means for receiving higher layer signaling, from a base station (BS), semi-statically configuring a plurality of resource allocation patterns at the apparatus, wherein each of the plurality of configured resource allocation patterns indicates a first one or more resources available to use for physical downlink shared channel (PDSCH) communication with the BS and indicates a second one or more resources excluded for PDSCH communication with the BS;
 means for receiving, from the BS, dynamic control signaling indicating at least one of the configured plurality of resource allocation patterns to use for communicating; and
 means for communicating based on the indicated at least one resource allocation pattern.

20. The apparatus of claim 19, wherein the indication of the at least one of the configured plurality of resource allocation patterns is based on at least one parameter associated with a transmission.

21. The apparatus of claim 20, wherein the at least one parameter comprises a slot configuration for the transmission.

22. The apparatus of claim 20, wherein the at least one parameter comprises at least one of: whether the transmission is for uplink, downlink, or sidelink; a component-carrier (CC) used for the transmission; a subband used for the transmission; a transmission time interval (TTI) length of the transmission; a channel used for the transmission;
 a subframe used for the transmission; or a location of the apparatus in a cell.

23. The apparatus of claim 19, wherein the first one or more resources is associated with a first symbol and the second one or more resources is associated with a second symbol, and wherein the second symbol is different from the first symbol.

24. The apparatus of claim 19, wherein each of the plurality of resource allocation patterns defines a first transmit power for a third one or more resources higher than a second transmit power for a fourth one or more resources.

25. The apparatus of claim 19, wherein the higher layer signaling comprises radio resource control (RRC) signaling.

26. The apparatus of claim 19, wherein the first one or more resources or the second one or more resources are indicated at a resource block level and at a symbol level of granularity.

27. The apparatus of claim 19, wherein the higher layer signaling further indicates a time-domain pattern for the first one or more resources or the second one or more resources.

28. The apparatus of claim 19, wherein the first one or more resources are resources available to use for PDSCH data communication with the BS and the second one or more resources are resources excluded for PDSCH data communication with the BS.

29. A non-transitory computer readable medium having computer executable code stored thereon for wireless communications by a user equipment (UE), comprising:

code for receiving higher layer signaling, from a base station (BS), semi-statically configuring a plurality of resource allocation patterns at the UE, wherein each of the plurality of configured resource allocation patterns indicates a first one or more resources available to use for physical downlink shared channel (PDSCH) communication with the BS and indicates a second one or more resources excluded for PDSCH communication with the BS;

code for receiving, from the BS, dynamic control signaling indicating at least one of the configured plurality of resource allocation patterns to use for communicating; and code for communicating based on the indicated at least one resource allocation pattern.

30. The non-transitory computer readable medium of claim 29, wherein the higher layer signaling comprises radio resource control (RRC) signaling.

\* \* \* \* \*